R. P. BARNSTEAD.
MEANS FOR EMPTYING AND CLEANSING BED PANS.
APPLICATION FILED SEPT. 23, 1912.

1,096,591.

Patented May 12, 1914.

Witnesses;
M. L. Waite.
Norman J. MacGaffin

Inventor,
Robert P. Barnstead;
By A. B. Upham.
Attorney.

UNITED STATES PATENT OFFICE.

ROBERT P. BARNSTEAD, OF BOSTON, MASSACHUSETTS.

MEANS FOR EMPTYING AND CLEANSING BED-PANS.

1,096,591.      Specification of Letters Patent.      Patented May 12, 1914.

Application filed September 23, 1912. Serial No. 721,926.

*To all whom it may concern:*

Be it known that I, ROBERT P. BARNSTEAD, a citizen of the United States, and a resident of Boston, in the county of Suffolk and Commonwealth of Massachusetts, have invented certain new and useful Improvements in Means for Emptying and Cleansing Bed-Pans, of which the following is a full and exact description.

One of the very unpleasant tasks of hospital work is that of emptying and cleansing bed-pans, an operation, moreover, which it is almost impossible to keep from vitiating the atmosphere of other apartments.

The object of this invention is the construction of a hopper into which a bed-pan can be placed, and, after closing the hopper, the bed-pan can be emptied and thoroughly washed through the operation of external means. To this end, I provide the hopper with a revolving shelf or frame upon which the bed-pan can be easily clamped, and into which a stream of water or other cleansing fluid can be thrown as the shelf and pan are turned over and the latter emptied.

Another purpose of the invention is to make the cleansing jet automatic with the over-turning of the bed-pan.

Figure 1:
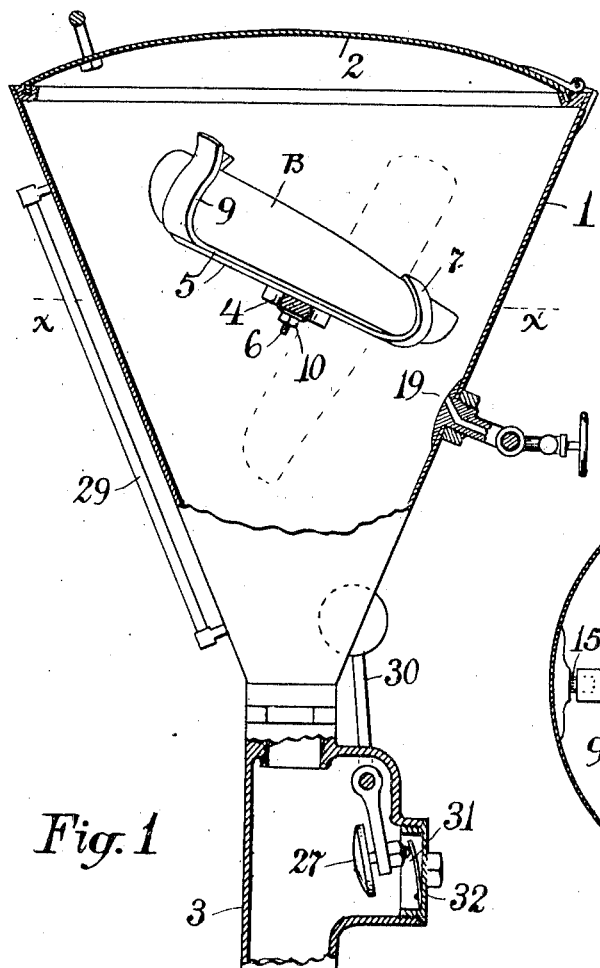
Figure 3:
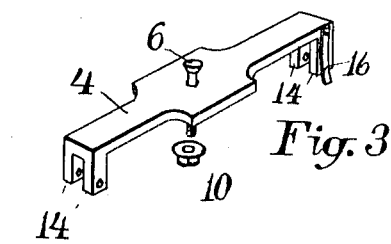
Figure 2:
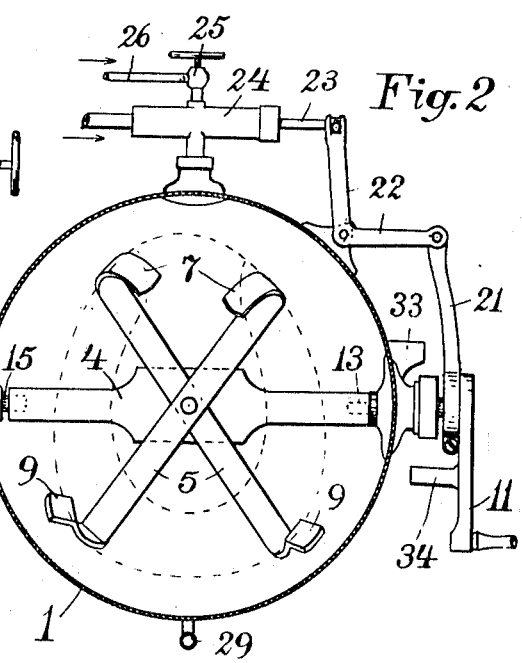
Figure 6:
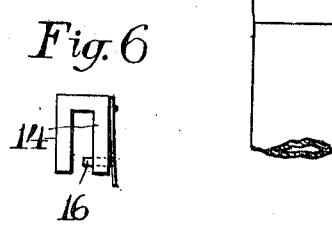
Figure 4:
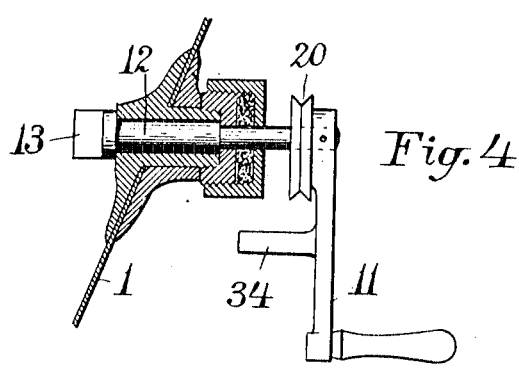
Figure 5:
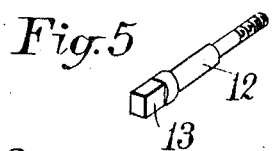

In the drawings forming part of this specification, Figure 1 is a side sectional view of a hopper having my improvements embodied therein. Fig. 2 is a horizontal section on the line X—X in Fig. 1. Fig. 3 is a perspective view of the main part of the revolving shelf. Fig. 4 is a sectional detail view of the packing box and bearing for the operating shaft and handle. Fig. 5 is a perspective view of said shaft. Fig. 6 is an end view of said main part.

The hopper itself is preferably of usual shape, comprising a copper conical chamber 1 having hinged cover 2 and an outlet 3 leading through some form of trap to the sewer.

The tilting or revolving shelf for the reception of the bed-pan consists preferably of a bar 4 shown in Figs. 2 and 3, removably and rotatably mounted in the hopper and carrying the supporting and gripping arms 5, the latter being secured together and to said bar by a bolt 6. At one end of each arm is an up-turned hook 7 adapted to receive the smaller end of the bed-pan B, as indicated in Fig. 1; and at the opposite end of each arm is a hook 9 only sufficiently overhung to hold the bed-pan in place while permitting its easy withdrawal, as shown in Fig. 1. Normally, the tilting shelf is horizontal, and with a single motion the bed-pan is thrust beneath the hooks 7 at its smaller end, and then pressed down between the overhung hands 9, the latter resiliently yielding to admit the same. Usually the bed-pans of a hospital are all of one style and size, but differ in the various hospitals. To adapt the same arrangement for the different bed-pans, all that needs to be done is to loosen the nut 10 of the bolt 6 and swing the arms 5 nearer together or farther apart until properly adjusted.

For the tilting or rotation of the shelf and pan, a crank arm 11 is provided and joined to the shelf by a spindle 12 at whose inner end is a flat head 13 loosely fitted between the bifurcation 14 at an end of the bar 4, the opposite end of the bar being provided with like bifurcation entered by a fixed pin 15. Spring controlled pins 16, illustrated in Fig. 6, serve to lock the bar in place upon said pin 15 and head 13 when, by the rotation of the crank and spindle, the shelf is turned over. By withdrawing said spring pins, the shelf can be removed from the hopper for thorough cleaning and other purposes.

When the bed pan is tilted to the position indicated by dotted lines in Fig. 1, a jet of water or other cleansing fluid is directed inward and upward against the pan through the nozzle 19. This may be controlled by means of any hand-operated valve, but I prefer to actuate the same automatically so that nothing needs to be done beside clapping down the cover and giving the handle or crank arm 11 a turn or two. To this end, the spindle 12 or crank arm 11 is provided with an eccentric 20 joined by a pitman 21 to the bell crank lever 22 whose other end is connected with the stem 23 of a plunger valve 24. Hence, when the shelf and pan are turned for emptying the pan of its contents, the valve 24 is automatically opened and a stream of water admitted to the hopper and directed upon the bed pan. When the shelf is returned to its normal position, either by turning it back, or revolving it for an entire rotation or two, the valve is closed and the cleansing stream discontinued.

If it is wished to sterilize the bed pan or the hopper or both, a valve 25 may be turned to admit steam from a steam pipe 26. For soaking the interior of the hopper at any time, the hopper valve 27 is closed and the plunger valve 24 permitted to remain open for a sufficient length of time for the flow from the nozzle 19 to nearly fill the hopper, a water glass 29 serving to show the height of the rising water.

In using the hopper, the nurse brings the bed pan covered by a towel, introduces the same upon the shelf, pulls off the towel, slams down the cover, gives the crank arm a turn, and the work is done, nothing remaining but to open the hopper and take out the pan completely cleansed. If the patient is sick with an infectious disease, steam is admitted to the hopper before removal of the bed pan.

The valve 27 is shown as wide open in Fig. 1, and as counterpoised in such position by the weighted arm 30. Inasmuch as the shock of this valve when it is thus thrown open is liable to disturb patients in near-by rooms, I provide a shock absorber therefor comprising the leaf spring 31 fastened at one end to the inner surface of the removable cover 32. This feature of a removable cover is a most important one, not only for the admission and adjustment of the valve in the construction of the apparatus, but for the removal of any paper, twine or other accumulations from the valve by which the latter would be prevented from closing tightly.

It often happens that certain hospitals use bed pans which are so much longer than those ordinarily employed and for which the hopper or receiving chamber has been proportioned, that they are in danger of striking the walls of the hopper and either denting the latter or breaking the pan,—when the same is of china-ware or earthen-ware. To prevent all danger of this, I provide a stop 33 rigid with the hopper, against which a projection 34 rigid with the crank arm 11 strikes when a turn of the latter would otherwise bring a bed pan against the inner surface of the hopper at any point. By first turning or tilting the shelf to present the inner surface of the bed pan to the impact of the fluid-jet, and then turning it back to present the under surface of the bed pan to the jet, the pan is entirely cleansed inside and out.

What I claim as my invention and for which I desire Letters Patent is as follows, to wit:—

1. The combination with a receiving chamber, of a tilting shelf therein adapted to receive and grip a bed-pan or the like, means for revolving said shelf, and a water inlet to said chamber located below the level of said shelf and disposed for directing the water obliquely inward and upward toward the center of said shelf, whereby immediately after the bed pan is overturned and its contents discharged therefrom, the water jet will strike and cleanse the interior of the pan.

2. The combination with a receiving chamber, of a tilting shelf therein adapted to receive and grip a bed pan or the like, externally operative means for rotating said shelf, a pipe for admitting a jet of water within the said chamber against the article carried by the shelf, a valve for said pipe, and means for opening and closing said valve controlled by said shelf rotating means.

3. The combination with a suitable receiving chamber, of a horizontal spindle having a crank arm at its outer end exterior to said chamber and a flat head at its opposite end within the chamber, a horizontal bar having downwardly extending bifurcations at one end engaging said flat head and adapted to be rotated thereby, a rotative support for the other end of said bar, and means for securing a bed pan upon said bar.

4. The combination with a suitable receiving chamber, of a horizontal spindle having turning means at its outer end exterior to the chamber, the other end of said spindle being within the chamber, a tilting shelf operatively connected with said spindle, means for securing a bed pan upon said shelf, a nozzle adapted to direct a jet against a bed pan held by the shelf, a valve and pipe for conveying a cleansing fluid to said nozzle, and means controlling said valve operated by said spindle.

In testimony that I claim the foregoing invention, I have hereunto set my hand this 20th day of September, 1912.

ROBERT P. BARNSTEAD.

Witnesses:
A. B. UPHAM,
ALEXANDER I. PECKHAM.